Jan. 16, 1934.  W. M. BAILEY  1,943,714
COMBINATION HIGH AND LOW CAPACITY CONDENSER
Filed May 21, 1930
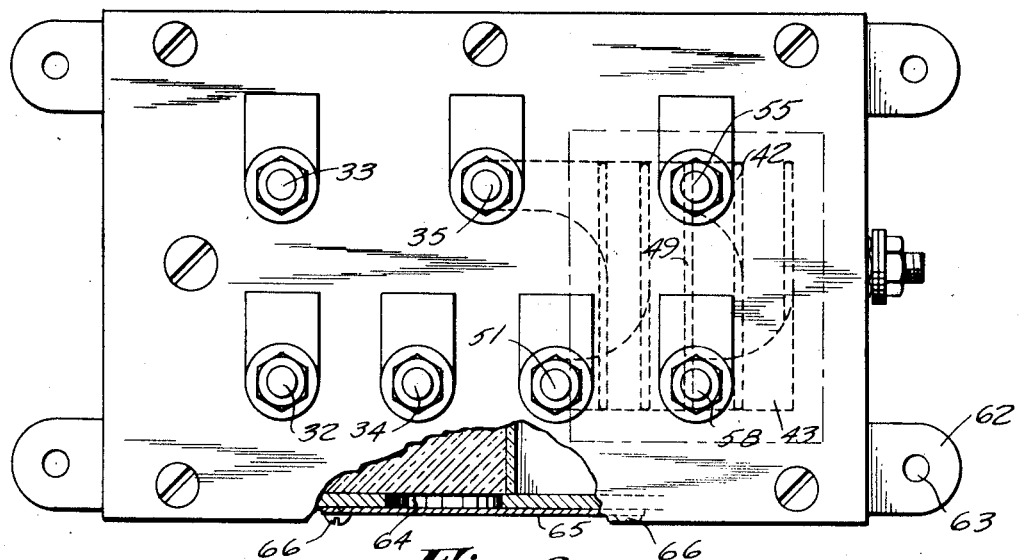
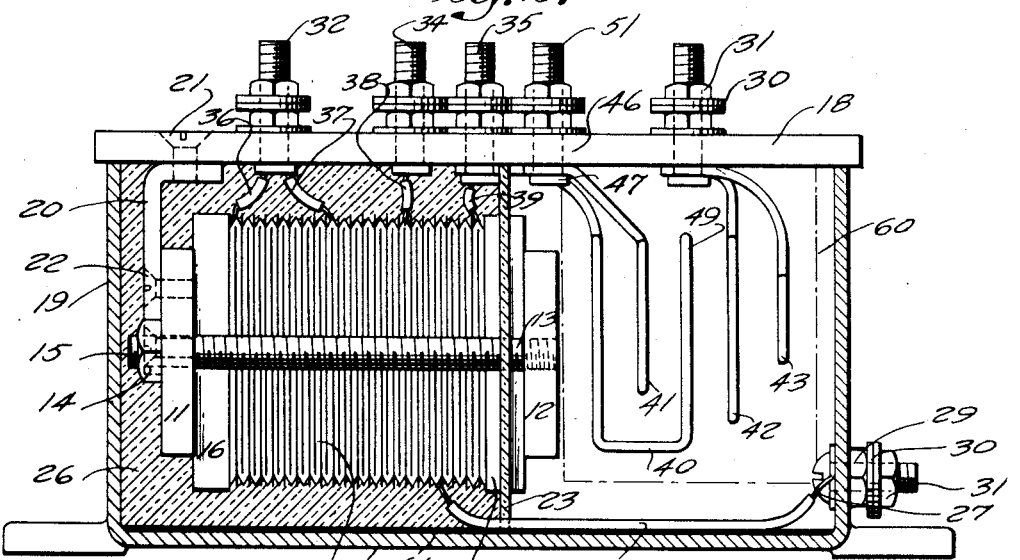
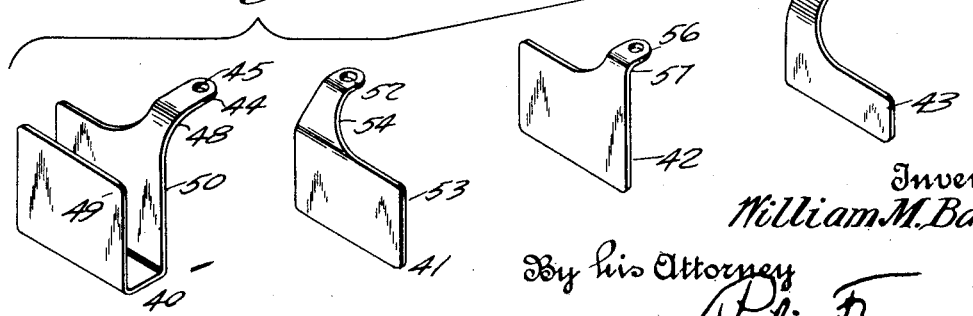
Inventor:
William M. Bailey
By his Attorney
Philip Farnsworth Patented Jan. 16, 1934

1,943,714

UNITED STATES PATENT OFFICE 1,943,714

COMBINATION HIGH AND LOW CAPACITY CONDENSER

William M. Bailey, Lynn, Mass., assignor, by mesne assignments, to General Electric Company, a corporation of New York Application May 21, 1930. Serial No. 454,337

36 Claims. (Cl. 175—41)

This invention relates to condensers of the type which can be so used that various capacities are effective. An object of the invention is to provide a light weight condenser adapted for both long and short waves with minimum heating and suitable for airship use. The invention is herein illustrated as a multiple unit condenser containing within a single casing both a so-called mica and foil stack capable of handling high voltage and having high capacity, and, also in the same casing, a condenser of low capacity, capable of standing high radio-frequencies with low dielectric loss. Each of these condensers may be provided with a number of terminals so connected to the respective condensers that various capacities are available.

The low capacity condenser is herein illustrated at right as made up of plates separated from each other by spaces preferably and usually amounting to several times the thickness of the plates, and these plates are herein illustrated as embedded in a block of sulphur which is cast around and between them before assembling them in the casing, although for some purposes other dielectric material may separate them. Other features and advantages will hereinafter appear.

In the accompanying drawing, Fig. 1 is a plan view of one form of the combined condenser unit.

Figure 2 is a sectional view of the same.

Figure 3 is a diagrammatic perspective view of the individual armature plates forming the parts of the low capacity condenser at right, Figs. 1 and 2.

A high capacity stack 10, capable of handling high voltages, as above, may be built of a large number of alternate sheets of mica and sheets of metal foil connected in the usual way. As well known and widely practiced to withstand high voltages, the armatures are arranged so as to be included generally serially in the circuit, either by way of conducting connections or by being so called "floating" armatures connected in series electrostatically by way of the dielectrics between the armatures themselves. The exemplary embodiment at 10 is a common form shown in Fig. 2 by the ordinary conventions, and includes a plurality of sections (21 shown) each including a substantial number of armature foils separated from one another by thin mica sheets, the sections having their faces insulated from one another by the insulating sheets shown projecting radially outward from the stack 10, alternate foils of each section also projecting respectively in two bunches from opposite sides of the stack, and the foil-bunches of adjacent sections being soldered together so that all the sections are connected in series; the circuit-leads shown being connected to the soldered-together like-potential foil-bunches of two adjacent sections. Stack 10 is held between plates 11 and 12 which may be of insulating material and serve to bind the stack sheets together, being held together by rods 13, which extend along the sides of the stack, outside it and from end to end, and are threaded into the plate 12 and passed freely through the plate 11, so that nuts 14 may be screwed down on the threaded ends 15 of the rods against the plate 11 and bind the stack sheets together. Between the stack 10 and the plates 11 and 12 are the usual end pressure plates 16 and 17 of metal or insulating material. The stack 10 may be supported from the insulating cover 18, in position parallel thereto, by an angle bracket or cantilever 20 held to the cover by a screw 21 and held to the plate 11 by screws 22. At the opposite ends of the stack 10 there may be provided an insulating plate 23 extending beyond the plate 17, so that the plate 23 forms a partition wall resting on the bottom of the casing 25 which holds the condenser. The insulating plate or wall 23 is adapted to hold wax, so that molten wax may be poured into the space at its left around the stack 10, through an opening 64 in the casing, Fig. 1. The wax is confined by the plate 23 in the stack-chamber at left, and fills that space embedding stack 10 as illustrated at 26. A flat cover and name plate 65 may be held to the casing 25 by screws 66 to cover the casting opening 64 in metallic casing-portion 25.

Alternate foils or plates of one section of the stack 10 intermediate its end section are connected in parallel to a conductor 27 as shown provided with a thick insulating covering 28 and leading to a grounded terminal 29 preferably at one side of the casing 25. This terminal 29 may be provided with the usual washers 30 and nut 31. In order to utilize various capacities of the stack 10 there are provided a number of other terminals 32, 33, 34 and 35 connected respectively to various separate portions of the stack 10 by leads 36, 37 and 38 and 39, so that when the side of the external circuit which is connected to the terminal 29 is the ground side of the circuit as above, then various capacities may be introduced into that circuit by connecting the other side of the circuit to one or the other of the terminals 32, 33, 34 or 35. In any such case the potential of stack 10 risen from lead 28 leftward, and the insulating plate 61 permits such left portions of the stack to lie closer to the grounded metal bottom wall 25 of casing-box. And when the plurality of stack-sections at the right hand portion of the stack are connected between terminals 35 and 29 then the stack-potential rises rightward of the point of connection of lead 28 to the stack, and insulating sheet 61 and the insulating covering of lead 28 lie between the grounded casing and such high potential portions of the stack.

In addition to the stack 10, the casing 25 also contains a low capacity condenser of high dielectric strength which is herein illustrated as made up of five relatively stiff plates 40, (doubled at 49, 50, Fig. 3), 41, 42 and 43 spaced from each other by a distance several times as great as the distance between adjacent foils of the stack 10 so as to obtain the desired capacity and provide for withstanding high potentials in the external circuit. The faces of these widely spaced armatures are preferably of the same general order of area as the foil-armatures of stack 10. This low capacity portion of the complete condenser is located in the casing chamber at right of partition 23. Any good dielectric may occupy the field-space between the several pairs of stiff plates 40—43.

The U-plate 40 may be connected to and supported by the terminal 35 in casing-cover or wall 18 by a horizontal integral lug 44, Fig. 3, provided with a hole 45 through which the neck 46 of the terminal 35 is adapted to pass and hold it by its head 47. The lug 44 may be bent around a half inch radius at 48, and then widened out into a plate, which may be U-shaped, having two opposing faces. In one form of the device, Fig. 3, the free leg 49 of the U 40 is one-and-nine-sixteenth inches long and is spaced eleven-sixteenths of an inch from the leg 50 which carries the lug 44. When the terminal 35 is connected to one side of an external circuit, the other side of such circuit may be connected to a terminal 51 on insulating casing device 18, which terminal 51 engages a lug 52 bent over from the top 53 of the plate 41 adapted to lie between the legs 49 and 50 of the U plate 40, extending down about one and one-eighth inches flat-wise between the legs 49 and 50 of the U, and being connected at an angle of 45° by an arm 54 to the lug 52, so as to leave a wide space between plate 41 and the leg 50 of the U-shaped plate 40.

In addition to the small capacity between the plates 41 and 40 a different small capacity may be obtained in an external circuit between the widely spaced armature plates 40 and 42, of different effective areas from plates 40—41, by suitably connecting one or both of them in circuit therewith or separately, as shown. For this purpose the plate 42 is connected to a cover-terminal 55 by a lug 56, which may be bent over sharply at 57. The plate 42 may be somewhat larger than the plate 41, such as one and five-sixteenth inches deep at the part which faces leg 49 of the U plate 40, thus giving a smaller capacity between 40 and 42 (terminals 35 and 55) than between plates 40 and 41 (terminals 35 and 51).

When it is desired to have a still smaller capacity in the circuit, yet another plate 43, may be added, to cooperate with plate 42, one side of the circuit being connected to the plate 43 by a cover-terminal 58 through its lug 59 corresponding in many ways to the lug 44 of the U plate 40 so that a wide space is provided between the plate 42 and its lug 59. This plate 43 in the device above mentioned may have an effective area facing the plate 42 which is five-eighths of an inch deep, thus enabling the smaller capacity to be obtained between plates 42 and 43, terminals 55, 58. These plates 41, 42 and 43 may be connected to their terminals mechanically in the way the plate 40 is connected to its terminal. Thus each of plates 40—43 is supported by the removable casing-wall 18.

Although the cover-terminals 33, 35, 55 and 32, 34, 51 and 58 are set in regular rows, the terminal 35 for the U-shaped plate 40 is spaced far from the terminals 51 and 55 for plates 41 and 42 each of which may be connected to the opposite side of an external circuit (from 40) when in use, and that the terminals 55 and 58 for plates 42 and 43 lie at opposite edges of the casing cover 18, with the result that short circuiting is minimized.

When a fine adjustment of capacity value is not required by way of any of the low values of low-capacity unit 40—43, various large values of capacity are obtainable by connecting the leads of the external circuit across any pair of circuit terminals 32, 33, 34 and 35 mounted on the outside of terminal support 18, and terminal 29 at lower right. The large capacity not only of entire stack 10 but of any of its portions between any pair of said circuit terminals is due to the fact that each serially connected section of the stack (indicated by its portions between each pair of outwardly projecting section-separators shown in Fig. 2) as usual, includes a plurality of a dozen or so armature foils, a plurality of such multi-foil sections being shown between each pair of leads 36, 37, 38, 39 and 23, which are connected respectively to the circuit terminals 32—35, and 29; so that a very large number of armature-foils are connected between any two of said circuit terminals. Thus each of the capacity values of stack 10 is very large which can be included in an external circuit between any two of the circuit terminals connected to the leads to stack 10, whereas on the other hand each of the value of the low-capacity portion 40—43 at right is very small, the circuit terminals 35, 51, 55 each being connected to only one of the several widely spaced armatures 40—43. So that when it is desired to include in the external circuit not merely a high capacity but a high capacity of a very precise value, there may be included in such circuit a desired high capacity portion of stack 10 (or the entire stack) plus (in series with) a desired small capacity portion of low-capacity condenser 40—43; circuit terminal 35 for example being connected to both high and low condenser-portions 10 and 40—43, so that the desired precise capacity value can be included by connecting to the external circuit the desired two circuit-terminals of which one is connected to stack 10 and the other to portion 40—43. In no case is it necessary that lead 28 be connected to an actual ground, altho in any case where a high capacity value of high capacity stack 10 is desired to be included in the external circuit, than terminal 29 of lead 28 can be connected to one side of the circuit.

In Fig. 1, extending rearwardly from the circuit terminals mounted in support 18, are shown the plates on which may be marked indicia for making the various circuit connections to include specified values of capacity, these plates being called terminal markers. The terminal support 18 preferably as shown has a large surface area, of the same general order as that of the top of the adjacent condenser 10, 41—43 (somewhat larger, as shown, so as to serve as cover for the metallic casing-portion 25 of which the walls are spaced from the condenser), and the plurality of circuit terminals 32, 33, 34, 35, 51, 55 and 58 being distributed over said surface area of support 18 so that the terminals will be spaced widely apart for high voltage service. Terminal-support 18 preferably is of insulating material so that the terminals thereby are insulated from one another obviating need otherwise of insulating bushings for each terminal.

When the parts 40—43 are assembled with cover 18, stack 10 and partition 23, and before assembly with casing-box 25, a sulphur block shaped as indicated in broken lines 60, Fig. 2, may be cast around and between the plates 40, 41, 42, 43 to serve as the dielectric and embedment, being formed by casting the molten sulphur on the inverted cover 18 in a temporary mold of cardboard built around the plates 40, 41, 42, 43 so as to wholly embed the plates from the cover 18 down, but not unnecessarily project beyond them, thus avoiding unnecessary weight. The heavy but highly effective dielectric sulphur block 60 spaced from metallic casing 25 and suspended from removable cover 18 thus adds no more weight than the relatively light wax 26 which embeds stack 10. All corners of these plates 40—43 are rounded as shown, thereby minimizing any tendency to brush discharge at high voltages.

The casing 25 may be provided with an insulating inside plate 61 along its bottom; and may be provided with lugs 62 at its corners, which project and are provided with screw holes, 63, so that it may be connected by screws to any desired structure. The terminals 32, 33, 34, 35, 51, 55 and 58 may be provided with the usual washers 30 and nuts 31.

As above, the high capacity condenser 10 and the low capacity unit 40—43 may be used independently of one another as above, or both used together, with different values of each, so as to obtain as a fine adjustment of large capacity in an internal circuit.

Among the other advantages of this invention may be mentioned the adaptability of the sulphur embedment 60 to have a suitable dielectric constant, yet by reason of its low phase angle cause smaller dielectric losses with very short waves in a circuit to which any pair of plates 40—43 may be connected. The casing 25, when of metal as generally preferred for strength, is preferably of aluminum or aluminum alloy in order to obtain the lightest weight construction; and the end blocks 11—12, 16—17 of the mica stack 10 may also be of aluminum. The embodiment illustrated constitutes a substantial reduction in weight over what the weight of such condensers would be if embodied in separate casings. Where sulphur is used at 60 there is a tendency for it to crack upon solidification even though precautions are taken to prevent it, so that it is desirable to make sure that the sulphur is not cracked before assembling the condenser and sending it out into use and for this reason the embodiment illustrated (with 60 cast to cover 18 before assembly with casing 25) is desirable since it enables the factory to ascertain whether the sulphur embedment in the short wave side of the structure at right, Fig. 2, is free from cracks, it being only necessary to inspect the solid sulfur after solidification to see if it is free of cracks before assembly of the unit consisting of the cover-wall 18, the armature 40—43 and the sulfur casting 60.

Having thus described certain embodiments of the invention, what is claimed is:

1. A condenser structure comprising in combination a casing including a box and a cover, a plurality of condensers enclosed therein, one of said condensers being enclosed by an insulating embedment in contact with said box and another of said condensers being enclosed in an insulating embedment which is spaced from said box.

2. A condenser structure comprising in combination a casing including a box and a cover, a plurality of condensers enclosed therein, one of said condensers being enclosed by an insulating embedment in contact with said box and another of said condensers being enclosed in an insulating embedment which is spaced from said box, and an insulating barrier and an air space separating the two embedments.

3. A condenser comprising in combination a casing, a mica foil stack therein, and cantilever supporting means for said stack secured to a wall of the casing, connecting leads secured to the stack and passing thru said casing, and an insulating embedment cooperating with said cantilever means in supporting said stack inside the casing.

4. The combination with a casing, of a high capacity condenser within the casing and having separate sections individually connected to different terminals on said casing, and a lower capacity condenser within the casing having separate sections comprising plates of various areas, one plate being connected to one of said terminals, and other of said plates of various areas being individually connected to other terminals on said casing.

5. The combination with a casing, of a high capacity condenser of the foil and mica type within said casing and divided into sections, a terminal for each section, a low capacity condenser also within the casing including spaced plates of various areas, one of which plates is connected to one of the other terminals, and other terminals in regular widely spaced rows connected to the other plates.

6. The combination with a casing, of a high capacity condenser within the casing, a terminal for said condenser on the casing, a low capacity condenser also within the casing including various sizes of plates of which one is connected to said terminal, other terminals along the sides of said casing for said low capacity condenser, one of said plates including a lug by which it is supported from its terminal, and an arm between the lug and the plate spaced widely from but passing beyond another of the plates.

7. The combination with a casing, of a high capacity condenser within the casing, a terminal for said condenser on the casing, a low capacity condenser also within the casing including various sizes of plates of which one is connected to said terminal, and other terminals along the sides of said casing for said low capacity condenser, one of said plates being U-shaped, another of said plates lying within the U and having an arm spaced from said U and carrying a lug, and supported by said lug from its terminal in one of said rows.

8. The combination with a casing of a high capacity condenser within the casing, a terminal for said condenser on the casing, a low capacity condenser also within the casing including various sizes of plates of which one is connected to said terminal, other terminals along the sides of said casing for said low capacity condenser, one of said plates being U-shaped, another of said plates lying within the U and having an arm spaced from said U and carrying a lug, another of said plates also comprising an arm spaced from a fourth of said plates, carrying a lug and supported by said lug from its terminal in one of said rows.

9. The combination with a casing, of a high capacity condenser within the casing, a terminal for said condenser on the casing, a low capacity condenser also within the casing including various sizes of plates of which one is connected to said terminal, other terminals along the sides of said casing for said low capacity condenser, one of said plates being U-shaped, another of said plates lying within the U and having an arm spaced from said U and carrying a lug, another of said plates also comprising an arm spaced from a fourth of said plates carrying a lug and supported by said lug from its terminal in one of said rows, and sulphur cast around the plates to serve as a dielectric.

10. A condenser casing including a high capacity condenser embedded in a relatively light solid dielectric, filling one part of the casing, and a low capacity condenser suitable for high tension currents imbedded in relatively heavy sulphur, said sulphur filling little more of the casing than the area of the plates it insulates.

11. A condenser comprising in combination a metallic casing, a separate wall therefor closing the same; stiff condenser elements inside the casing and secured to said wall for mechanical support thereby; and an embedment of readily fusible insulating material enclosing said condenser elements and lying adjacent said separate wall but spaced from the other casing-walls, said embedment, stiff condenser elements and wall constituting a unit for assembly with the casing; and the stiff condenser elements and embedment lying inside the casing when the separate wall is in place closing the casing.

12. A condenser comprising in combination a casing, a separate wall therefor closing the same; condenser armatures spaced substantially apart and secured to said wall; and readily fusible dielectric material cast in place between said armatures and supported thereby; one of said armatures having a shape interlocking with said dielectric securing the latter to the wall by way of said armature secured to the wall.

13. A condenser comprising in combination a casing, a separate wall therefor closing the same; condenser elements secured to said wall; and an embedment of readily fusible insulating material enclosing said condenser elements as an embedment therefor and spaced from said casing.

14. A composite condenser including a high capacity condenser consisting of closely associated armature and dielectric sheets, and a low capacity condenser connected thereto and including armature plates substantially spaced apart; a metallic casing for both such interconnected condensers; a barrier wall inside the casing between the two condensers; a mass of sulfur cast in place between and around the spaced armature plates of the low capacity condenser constituting the dielectric and an embedment therefor; and a mass of readily fusible insulating material other than sulfur cast in place about said high capacity condenser inside the casing as a mold and constituting an embedment of the high capacity condenser.

15. A composite condenser including a high capacity condenser consisting of closely associated armature and dielectric sheets; a low capacity condenser consisting of stiff armature plates substantially spaced apart and of a mass of readily fusible dielectric material cast in place between said plates and around them constituting both dielectric and embedment for the low capacity condenser; a metallic casing enclosing both said condensers; circuit-terminals on the casing and connected to the high capacity condenser and to the plates of the low capacity condenser; and leads from the two condensers by way of which they are connected together.

16. A composite condenser including a high capacity condenser consisting of closely associated armature and dielectric sheets; a metallic casing enclosing said high capacity condenser; and a low capacity condenser enclosed by the same casing; said casing including a separate cover; said low capacity condenser consisting of stiff armature plates secured to said casing-cover and of a mass of readily fusible dielectric material cast in place between said plates and around them constituting both dielectric and embedment for said low-capacity condenser, whereby when said cover is applied to the casing it supports said embedded low capacity condenser in position inside the casing.

17. A composite condenser including a high capacity condenser and a low capacity condenser connected thereto, the high capacity condenser including closely associated armature and dielectric sheets; and the low capacity condenser including armature plates substantially spaced apart and a mass of readily fusible dielectric material cast in place between said plates and around them constituting both dielectric and embedment for the high capacity condenser; a barrier wall between said two condensers; and a metallic casing enclosing both said interconnected condensers and said barrier wall and providing a space between the condenser and the casing; one of the walls of the casing being formed with an opening communicating with said space and casing as a mold for an insulating embedment for the high capacity condenser; said barrier wall in the casing separating the dielectric material of the low capacity condenser from the insulating embedment of the high capacity condenser.

18. A composite condenser including a high capacity condenser and a low capacity condenser conected thereto; a metallic casing for both said interconnected condensers; and a separate cover for said casing enclosing said condensers in the casing; the low capacity condenser including armature plates substantially spaced apart and secured to said cover, and including a mass of dielectric material cast in place between said plates and around them constituting both dielectric and embedment of the high capacity condenser; a barrier wall in the casing between said two condensers; said high capacity condenser including closely associated armature and dielectric sheets and clamping means therefor secured to the same side of said casing-cover as said spaced condenser plates, whereby when the cover is in place on the casing, the two condensers are in place inside the casing; the casing forming a space between its walls and said high capacity condenser, and the casing being formed with an opening communicating with said space and the interior of the casing as a mold for an insulating embedment for the high capacity condenser, said barrier wall separating the dielectric material of the low capacity condenser from the insulating embedment of the high capacity condenser.

19. A composite condenser including a high capacity condenser and a low capacity condenser connected thereto; a metallic casing for both said condensers; and a separate cover for said casing enclosing said condensers in the casing; the low capacity condenser including armature plates substantially spaced apart and a mass of sulfur independent of the casing and cast in place between said plates and around them constituting both dielectric and embedment of the high capacity condenser, said armature plates being secured to said cover whereby when the cover is in place on the casing the plates and sulfur casting are held in place in the casing by the cover; said high capacity condenser including closely associated armature and dielectric sheets; a barrier wall; said wall and casing forming a space between the high capacity condenser and the casing which space is separated by said barrier wall from said sulfur casting; and said casing being formed with an opening communicating with said space and the interior of the casing as a mold for an insulating embedment of said high capacity condenser; all whereby a material different from sulfur can be employed as the embedment for the high capacity condenser.

20. A composite condenser including a high capacity condenser and a low capacity condenser connected thereto by a metallic casing for both said condensers; and a separate cover for said casing enclosing said condensers in the casing; the high capacity condenser including a stack of armature and dielectric sheets; means clamping the ends of said stack holding said sheets in closely connected face-to-face relation; the low capacity condenser including armature plates substantially spaced apart and a mass of sulfur independent of the casing and cast in place between said plates and around them constituting both dielectric and embedment of the high capacity condenser, said armature plates being secured to said cover whereby when the cover is in place on the casing the plates and sulfur casting are held in place in the casing by the cover; a barrier wall; said wall and casing forming a space between the high capacity condenser and the casing which space is separated by said barrier wall from said sulfur casting; and said casing being formed with an opening communicating with said space and the interior of the casing as a mold for an insulating embedment of said high capacity condenser.

21. A light-weight composite condenser including a high capacity condenser and a low capacity condenser electrically connected together, and a single metallic casing common to both condensers; the high capacity condenser consisting of a stack closely associated armature and dielectric sheets, and the low capacity condenser including armature plates widely spaced apart and dielectric material filling the space between them; a barrier wall inside the casing between the two condensers therein; and a mass of readily fusible insulating material cast in place inside the casing around said high capacity condenser and constituting an embedment therefor independent of the dielectric between the spaced plates of the low capacity condenser.

22. A composite condenser including two portions one including a stack of closely associated armature and dielectric sheets and another portion including stiff armatures relatively widely spaced from one another; a casing for enclosing said condenser-portions said casing including a separate wall; said stiff armatures being secured to said separate wall; means clamping together the closely associated elements of said stack; means securing said clamped stack to said separate casing-wall; and a barrier wall separating said two portions of the composite condenser, said barrier wall being held in place by said stack-clamping means.

23. A condenser structure including a condenser having two sets of armatures of which one set is characterized by its armatures being stacked closely together with thin dielectric sheets only very slightly spacing them apart, in a plurality of serially-connected sections each including a plurality of armatures, said first armature set being characterized further by its armatures consisting of fragile foil sheets supported and protected by the thin dielectric sheets, the large number of the foils in the serially-connected sectional stack causing the armature set to occupy a large proportion of the volume of both armature sets notwithstanding the extreme thinness of the foils and their narrow spacing apart; and the other armature set being characterized by its armatures being relatively few but spaced widely apart whereby this set also occupies a large proportion of the volume of both sets notwithstanding the much smaller number of its armatures; in combination with a terminal support of the same general order of surface area of the entire condenser facing it; and a plurality of circuit terminals mounted on one face of said terminal-support, for both armature-sets; the armatures of the widely spaced set being connected severally to its said circuit-terminals; and a multiplicity of the armatures of the stacked set, including the armatures in a plurality of the serially connected stack-sections, being included between the respective pairs of the circuit terminals of said set.

24. A condenser structure including a condenser having two sets of armatures of which one set is characterized by its armatures being stacked closely together with thin dielectric sheets only very slightly spacing the armatures apart, said first armature set being characterized further by its armatures consisting of fragile foil sheets supported and protected by the thin dielectric sheets but said foil sheets being relatively large in number whereby the stack occupies a large proportion of the volume of both armature sets notwithstanding the extreme thinness of the foils and their narrow spacing apart; and the other armature set being characterized by its armatures being relatively few but spaced relatively widely apart and consisting of relatively stiff and correspondingly thick plates whereby this set also occupies a large proportion of the volume of both sets; in combination with a terminal support of the same general order of surface area as that of the portion of the entire condenser which faces it; a plurality of circuit-terminals mounted on one face of said terminal-support, for both armature-sets; the armatures of the widely spaced set being connected severally to its said circuit-terminals; and a multiplicity of the armatures of the stacked set being included between respective pairs of its circuit-terminals.

25. A condenser structure including a condenser having two sets of armatures the effective faces of which are of the same general order of area, but one set being characterized by its armatures being stacked closely together with thin dielectric sheets only very slightly spacing the armatures apart, said armatures being relatively numerous and the stack occupying a large proportion of the volume of both sets; and the other armature set being characterized by its armatures being relatively few but relatively widely spaced apart and also occupying a large proportion of the volume of both sets; in combination with a terminal-support of the same general order of surface area as that of the entire condenser facing it; and a plurality of circuit-terminals mounted on one face of said terminal-support, for both said armature-sets; the widely spaced armatures of this set being connected severally to its said circuit terminals; and a multiplicity of the armatures of the stacked set being included between its circuit-terminals.

26. A condenser structure according to claim 25 and wherein the two armature sets are enclosed in a casing including a box and a cover, and means are provided for securing to the cover the stack and the widely spaced armatures, the final assembly consisting of two units, one the box and two the cover and the two sets of armatures.

27. A condenser structure according to claim 25 and wherein the two armature sets are enclosed in a casing containing also two castings of low melting point, one being of wax and embedding the stack, and the other of sulfur and embedding and filling the spaces between the set of widely spaced armatures.

28. A condenser structure according to claim 25 and wherein the two armature sets are enclosed in a casing including a box and a cover, and means are provided for supporting the stack in position parallel to the cover and for supporting the set of widely spaced armatures in a position inside the casing at an end of the stack.

29. A condenser structure according to claim 25 and wherein a partition is located between the two sets of armatures; and two castings of insulating material of low melting point are located on opposite sides of said partition; one of said castings embedding the set of closely spaced armatures, and the other casting embedding the set of widely spaced armatures, said second casting being of good dielectric material and lying in the wide spaces between the armatures of its set.

30. A condenser structure according to claim 25 and wherein the two armature sets are enclosed in a casing including a box and a cover, the edges of the armatures of each set being spaced from the walls of the box, the spaces between the widely spaced armatures being in communication with the spaces between their edges and the box; and means being provided to bind together the sheets of the stack.

31. A condenser structure according to claim 25 and wherein the two armature sets are enclosed by a casing including a box and a cover; the individuals of the widely spaced armatures being secured severally to the cover; and the closely spaced armatures being supported as a separate mechanical stack unit inside the casing alongside the set of severally-supported widely spaced armatures.

32. A condenser structure according to claim 25 and wherein the stack of closely spaced armatures and the individual widely spaced armatures are embedded in insulating material of low melting point; and clamping means binding the closely spaced armatures together in the stack and excluding the embedment from access to the faces of the stack-armatures.

33. A condenser structure according to claim 25 and wherein the armatures of the widely spaced set are in the form of stiff and correspondingly thick plates, and the armatures of the stacked set are in the form of metal foil sheets.

34. A condenser structure according to claim 23 and wherein the areas of the effective faces of the armatures are of the same general order of magnitude.

35. A condenser structure according to claim 24 and wherein the foils of the stack are in general series relation with one another and thereby capable of high voltage use.

36. A condenser structure according to claim 25 and wherein one of the circuit terminals is connected to both a portion of the stack and one of the set of widely spaced armatures.

WILLIAM M. BAILEY.